United States Patent [19]

Earle

[11] 4,455,834

[45] Jun. 26, 1984

[54] WINDMILL POWER APPARATUS AND METHOD

[76] Inventor: John L. Earle, P.O. Box 185, Forest Grove, Oreg. 97116

[21] Appl. No.: 305,666

[22] Filed: Sep. 25, 1981

[51] Int. Cl.$^3$ .................... F01K 25/10; F03D 9/02
[52] U.S. Cl. ........................ 60/659; 60/671; 60/641.1
[58] Field of Search .............. 60/398, 641.1, 698, 60/659, 652, 413, 651, 671

[56] References Cited

U.S. PATENT DOCUMENTS

| 320,482 | 6/1885 | Leavitt | 60/413 X |
| 671,608 | 4/1901 | Ostergren | 60/641.1 |
| 784,005 | 2/1905 | Ketchum | 60/641.1 |
| 3,996,741 | 12/1976 | Herberg | 60/413 |
| 4,206,608 | 6/1980 | Bell | 60/698 |

FOREIGN PATENT DOCUMENTS

| 2489411 | 3/1982 | France | 60/652 |
| 27154 | of 1898 | United Kingdom | 60/659 |
| 1193680 | 11/1968 | United Kingdom | 60/659 |

Primary Examiner—Allen M. Ostrager
Attorney, Agent, or Firm—James Creighton Wray

[57] ABSTRACT

Air compressed by a windmill-driven compressor is stored as liquid in an underground cryogenic insulated tank. Pressurized air released from the tank is vaporized by a refrigerant circuit, heated, and used to operate an air motor which drives an electrical generator. Heat of compression extracted by compressor coolant heats vaporized air entering the motor and heats water stored in a ground-level tank located directly above the cryogenic tank. Solar and fossil fuel heating circuits further heat vaporized air entering the motor. Motor exhaust is used as a coolant in refrigeration circuits. The inlet and outlet conduits to the cryogenic tank are arranged to effect heat exchange. The windmill has a vertical axis rotor with curved blades mounted in a vaned housing.

32 Claims, 6 Drawing Figures

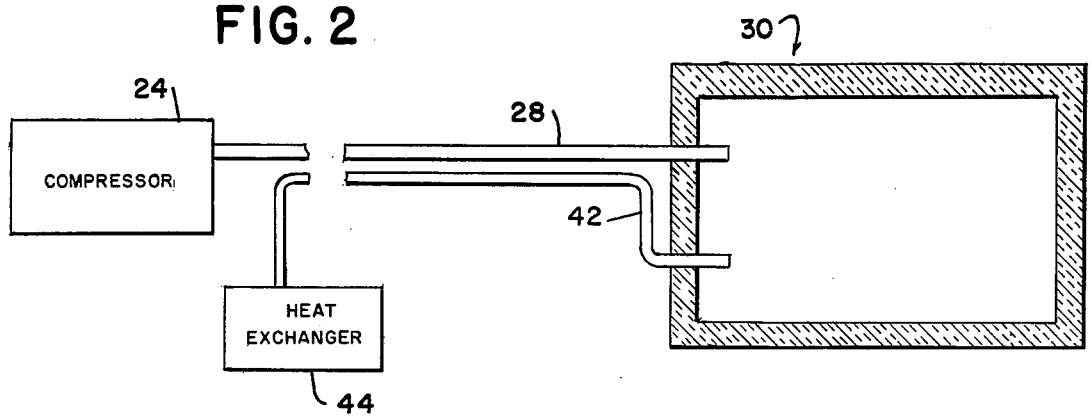
FIG. 2
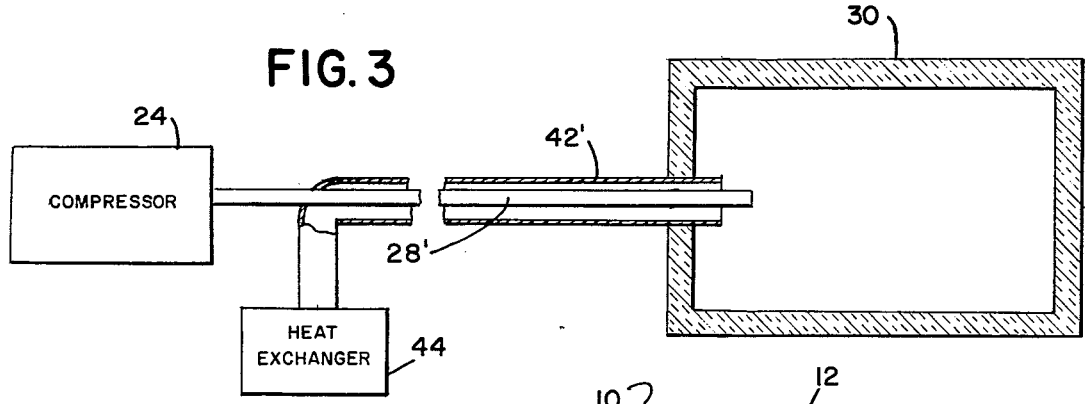
FIG. 3
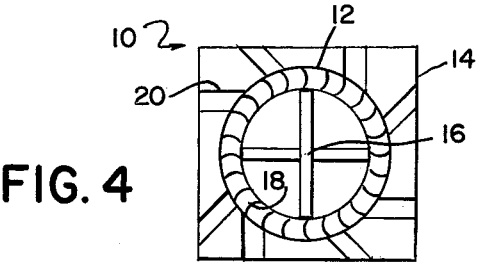
FIG. 4
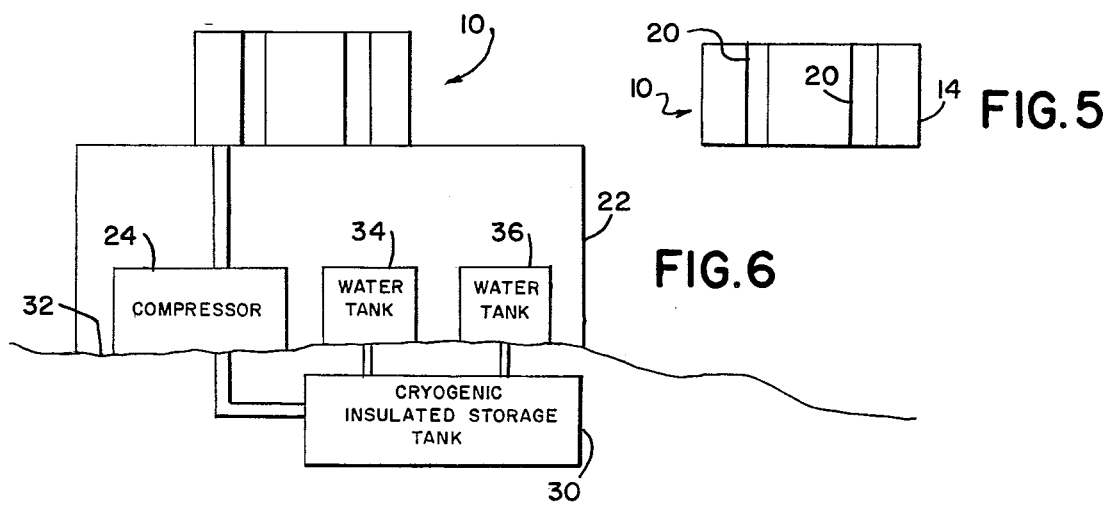
FIG. 5
FIG. 6

WINDMILL POWER APPARATUS AND METHOD

BACKGROUND OF THE INVENTION

This invention relates generally to power production and energy conservation and more particularly has reference to a windmill powered system for producing electricity, heat, refrigeration and water for home use.

Pertinent United States and foreign patents are found in Class 60, subclasses 320, 398, 604, 616, 641, 644, 648, 659 and 682; Class 123, subclass 122D; Class 126, subclass 247; Class 165, subclasses 48R, 50, 61, 104R, 104S, 105 and Digest 2; Class 290, subclasses 44 and 45; and Class 432, subclasses 4, 27, 219 and 721 of the Official Classifications of Patents in the U.S. Patent and Trademark Office.

Examples of pertinent patents are U.S. Pat. Nos. 943,000; 1,006,912; 1,936,233; 2,454,058; 2,539,862; 2,941,790; 3,367,111; 3,748,057; 3,783,858; 3,812,903; 3,841,100; 3,950,957; 3,980,130; 3,996,741; 4,000,617; 4,055,950; 4,058,979; 4,118,037; 4,143,522; 4,148,355; 4,150,547 and German Pat. No. 25 20 936.

U.S. Pat. No. 943,000 discloses a method for driving compressed air motors wherein a number of windmills operate air compressors that convey compressed air through piping to a storage tank. The compressed air is used for driving the air motors.

U.S. Pat. No. 1,006,912 discloses a compressed air system that uses a windmill to turn the compressor. Air from the compressor is directed through piping and stored in a storage tank. The compressed air is used to drive a tool mechanism or motor.

U.S. Pat. No. 1,936,233 discloses a wind turbo generator wherein the turning of a rotor of the air compressor by the windmill creates compressed air that is stored in a tank. The compressed air is used to create electricity.

U.S. Pat. No. 2,454,058 shows a power system which uses a windmill to turn an air compressor. Air from the compressor turns an air motor which turns a generator to produce electricity.

U.S. Pat. No. 2,539,862 discloses an air-driven turbine power plant wherein a windmill turns a pair of high pressure air compressors. The high pressure air is piped to a storage tank. The air is used to turn a turbine directly connected to an electric generator.

U.S. Pat. Nos. 2,941,790, 3,841,100 and 4,000,617 show the storage and use of gases within a gas turbine system.

U.S. Pat. No. 3,367,111 shows an energy retrieval system wherein pressurized exhaust gases of a group of turbine-generator assemblies pass through heat exchangers connected to each turbine generator. The heat from these heat exchangers is used in water heaters or boilers.

U.S. Pat. Nos. 3,748,057, 3,950,957, 3,980,130 and 4,148,355 show methods of converting heat generated by a compressor into mechanical energy.

U.S. Pat. No. 3,783,858 shows a wind operated heating system wherein wind, through a cyclic control device, communicates with heat storing liquid in pipes stored in a thermally insulated tank. The fluid in the pipes begins to oscillate in a motion which produces viscous dissipation and heat which may be distributed to an enclosure.

U.S. Pat. No. 3,812,903 shows a heating and cooling system capable of using solar heat. A tank of liquid is heated by solar heat which in turn warms stones in a container. A blower circulates air from a space to be heated through a filter into the container where the stones warm the air. The warmed air is then circulated back to the space to be heated.

U.S. Pat. No. 3,996,741 describes a method of electricity production wherein a plurality of windmills turn air compressors and the air is stored in a storage tank sealed by water and is available for work such as driving an air turbine to operate an electric generator.

U.S. Pat. No. 4,055,950 discloses a method of energy conversion wherein a windmill turns an air compressor and the compressed air is stored in a tank.

The air is used to drive a prime mover coupled by gears to an electric generator.

U.S. Pat. No. 4,058,979 shows an apparatus wherein a windmill portion turns an air compressor and the air is stored. The system has a predetermined output pressure for use in driving a turbine coupled to an electrical powered generator.

U.S. Pat. No. 4,118,637 shows an energy system which uses multiple sources of energy to create electricity. One of these sources is wind power for compressing air. The air is stored and ultimately used to create electrical power.

U.S. Pat. No. 4,143,522 shows a windmill operated system wherein a windmill drives a fluid pump which operates a hydraulic motor. Fluid is recirculated through a fluid reservoir where heat is stored and used for heating water for residential or building purposes.

U.S. Pat. No. 4,150,547 shows a regenerative heat storage compressed air power system wherein the heat of compression is stored underground in a compressed air storage cavern when it is cooled and thereafter stored in an air storage cavern. When energy is needed, the air is drawn back through the heat storage cavern where it is heated and then applied to assist in the heating of gases passing between the turbines.

U.S. Pat. Nos. 4,143,522 and 3,783,858 disclose windmill power systems using heat generated by a motor for various heating purposes.

German Pat. No. 35 20 936 shows a liquid gas vaporizer system for vaporizing and heating a liquid gas. Waste heat generated by a powered heat engine is interposed with a drinking water extraction system. The extraction system extracts heat from a turbine discharge system and may be applied to fresh water production from the sea or brackish waters. In this way, industrial liquid effluent can be used as a heat source and as a raw water supply after cleaning.

None of the foregoing patents discloses an economical and energy efficient power system which is readily adaptable to home use or which is capable of providing a substantial portion of home energy needs.

A need has long existed for a power system that is practical to provide utility independence for the homeowner or small user. Known windmill systems provide a degree of independence but do not provide any practical means for energy storage. Systems which operated by storing compressed fluids required unacceptably large storage tanks. Moreover, the pressurized storage tanks presented a significant explosion hazard.

In addition, known windmill systems suffered large heat and other energy losses and were thus very inefficient.

Aesthetics is yet another problem associated with known windmill power systems. The windmill portion of the system can be very unsightly, particularly when the system is used in an urban or suburban home.

SUMMARY OF THE INVENTION

The present invention overcomes many of the problems which exist in the prior art systems.

A windmill or wind turbine drives a compressor which provides high pressure air for accumulation as a liquid in a cryogenic insulated storage tank. The air is preferably compressed to about 200 atmospheres. Because liquid air is about 794 times as dense as atmospheric air, a great amount can be stored in a relatively small storage tank which is suitably insulated. Moreover, storage of liquid is preferable to storage of compressed air because a large volume of liquid can be stored in a relatively small vessel under a moderate pressure of about 20-30 atmospheres.

An outlet orifice in the storage tank vents the pressurized air at about 20 atmospheres. The orifice is designed so that its output comes back upon the high pressure inlet tube feeding the storage tank, so that the air released from the orifice receives heat from the inlet tube and is thus vaporized.

The liquid air is evaporated off under medium pressure as needed and is used to run an air motor, air engine or turbine, which could be similar to a steam engine, which in turn is easily throttled to drive an electric generator. The generator produces conventional 60 cycle AC power to meet the electrical needs of the home or building to be powered.

The system thus provides relatively quiet electrical power without the danger of the usual lead acid batteries. It also provides a longer useful life than such batteries.

A great amount of potential electrical energy can be stored in a relatively small tank of liquified air. For example, it is estimated that the needs of a home for 10 days could be stored in a liquified air storage tank having an 8' diameter and an 8' height.

The heat generated by compressing the air is communicated through heat exchange means connected to the compressor to pre-heat air entering the air motor and to heat water to provide a source of hot water for domestic use. In the prior art systems, the heat of compression was lost to the environment.

The use of a liquid cooled compressor is the preferred means for extracting the heat of compression. The liquid used to cool the compressor is heated by the heat of compression. When water is used as the liquid coolant, the heated water can be communicated to a storage tank where it is stored at a temperature elevated above ambient. When a substance other than water is used as the liquid coolant, a heat exchanger can be provided to communicate the heat of compression from the coolant to water stored in a storage tank. The stored water can be used to meet domestic hot water and heating needs. The excess hot water is used to pre-heat air entering the air motor.

Pre-heating the air entering the air motor increases system efficiency because it increases air volume while keeping the air pressure constant.

Although liquid air is most economical, other liquids may be used for both compressed gas storage and heat storage.

Other sources of heat can be used in addition to, or in lieu of, the heat of compression to pre-heat air entering the air motor. Solar heat can be collected and applied directly to the air through a heat exchanger. Another source is the burning of fossil fuel. Furthermore, this cycle may be applied to a steam engine or turbine system as well. When steam is available from solar or fossil heat, it could be steam powered. However, it could be augmented by the compressed air system described above.

Refrigeration can be obtained from the system in two ways. One is to allow the compressed and cooled air to expand. The other is to use the exhaust of the air motor if little heat has been added to the air entering the motor. The cooling obtained from the evaporating air and from the expansion of the air in the air motor can be stored in a cold water tank or can be used directly for refrigeration or air conditioning of the home. The system is capable of providing large refrigerators and freezers having extremely low temperatures as compared to standard freezers.

Condensed water vapor, either from the liquifaction process or from passing atomspheric air over coils cooled by the system, can be collected and used as a domestic source of water. In desert areas, this feature of the present invention could be extremely important.

Fractional distillation of the air is also relatively easy once the air is in the liquid state. If desired, oxygen and nitrogen could be obtained from the system by carefully controlling the temperature of the cryogenic tank. Fractional distillation would be preferred for larger system installations, such as power plants.

If desired, a small compressor driven by the air motor can be provided to refill the cryogenic tank during periods of wind drought. The solar heating circuit and fossil fuel heating circuit can serve as energy sources for the compressor.

A simple hot air or steam engine could be provided to supplement the domestic electricity supply during extended periods of wind drought.

A somewhat simpler system contemplated by the present invention would be identical to the above described system but would not utilize as high a working pressure and would thus not liquify the air. In this case, the air would be stored as compressed air. An air tank of from 10 to 100 times the volume would be required to store the equivalent energy. However, such a system would still have many of the benefits of the liquid air system.

A preferred physical configuration for the present invention is to provide a wind turbine or windmill mounted atop a structure or building. If desired, the turbine housing can be designed to blend with the architecture of the building.

The water storage and cooling tanks are located below the wind turbine on the ground floor of the building being powered.

The air storage tank is located below ground directly beneath the water storage tanks. In the event of rupture of the high pressure tank, the exploding air tank pieces would be directed upwardly by the surrounding ground and would be stopped by the water tanks. The hazard presented by the high pressure tank would thus be reduced to the minimum.

When it is desired to draw attention to the presence of the windmill, it is contemplated that the turbine described above can be replaced by a windmill in the shape of an old Dutch mill.

Regardless of the type of windmill used, the solar collector is mounted atop the windmill structure.

It is contemplated that any type of wind motor can be used with the power system of the present invention. A windmill which has proved particularly useful is a vertical axis turbine having curved vertical blades on a rotor mounted in a housing having guiding vanes that give the outward contour of a building.

The preferred windmill for use with the present invention is a horizontal axis windmill, such as the old Dutch-type mills.

Objects of the invention are, therefore, to provide an improved power system and to provide an efficient and economical power system which is practical for domestic use.

Another object of the invention is to provide a power system wherein a windmill is used to drive an air compressor.

A further object of the invention is to provide a system wherein air is compressed and stored in a liquid state in a cryogenic storage tank.

A further object of the invention is to provide a power system wherein liquified air is evaporated, heated and used to drive an air motor.

Still another object of the invention is to provide a power system wherein heat generated by the compression of air is used to pre-heat air entering an air motor.

Further objects of the invention are to pre-heat the air entering the air motor with a solar heating circuit and with a fossil fuel heating circuit.

Still other objects of the invention are to use the exhaust from an air motor as coolant in a refrigeration system and to evaporate liquified air in a refrigeration system.

Yet another object of the invention is to provide a power system which is capable of providing a substantial portion of domestic requirements for electricity, heat, refrigeration, and hot and cold water.

Still another object of the invention is to provide windmill power apparatus comprising windmill means for converting wind into compressor-operating energy, compressor means operatively driven by the windmill means for compressing a gaseous fluid to a relatively high pressure, storage means for accumulating compressed fluid in a liquid state, said storage means having outlet means for releasing accumulated liquid under pressure, and fluid motor means for receiving fluid released by the outlet means and being operatively driven thereby.

A further object of the invention is to provide windmill power apparatus comprising windmill means for converting wind to compressor-operating energy, compressor means operatively driven by the windmill means for compressing a gaseous fluid, storage means for accumulating compressed fluid, said storage means having outlet means for releasing accumulated fluid under pressure, heat extracting means for extracting the heat of compression generated in compressing the gaseous fluid, heat exchange means for communicating said heat of compression to the fluid released from the outlet means, and fluid motor means for receiving heated fluid from the heat exchange means and being operatively driven thereby.

A still further object of the invention is to provide a windmill power method comprising converting wind to compressor-operating energy, driving a compressor by the energy, compressing gaseous fluid to a relatively high pressure, accumulating compressed fluid in a liquid state, releasing accumulated fluid under pressure, and driving a fluid motor by said released fluid.

A further object of the invention is to provide a windmill power method comprising converting wind into compressor-operating energy, driving a compressor by the energy, compressing a gaseous fluid, accumulating compressed fluid, releasing accumulated fluid under pressure, extracting heat of compression generated in compressing the gaseous fluid, communicating said heat of compression to the released fluid, and driving a fluid motor by the heated fluid.

These and other further objects and features of the invention are apparent in the disclosure which includes the above and below specification and claims and drawings.

BRIEF DESCRIPTION OF THE DRAWINGS

FIG. 2 is a side elevational view, in section, of a cryogenic storage tank used in the present invention.

FIG. 3 is a side elevational view, in section, of another embodiment of a cryogenic storage tank used in the present invention.

FIG. 4 is a top plan view of a windmill used in the present invention.

FIG. 5 is a side elevational view of the windmill shown in FIG. 4.

FIG. 6 is a diagrammatic sketch showing a plan of installation of the present invention.

DETAILED DESCRIPTION OF THE DRAWINGS

Figure 1:
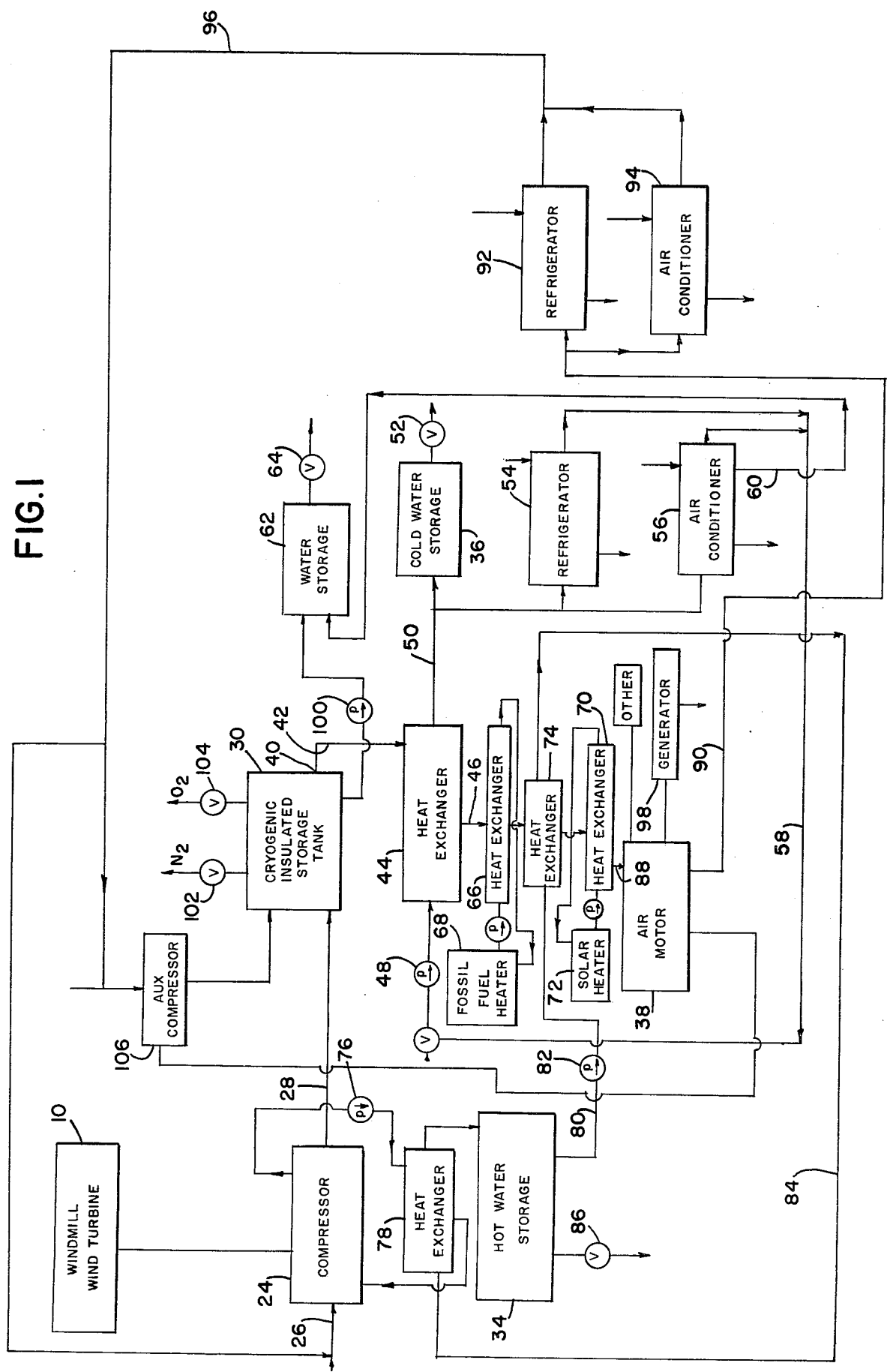
FIG. 1 is a schematic diagram of a power system embodying features of the present invention.

The present invention provides a power system designed primarily for home or other small-scale use. It is understood, however, that the system can be used in any environment.

A windmill or wind turbine 10 is the primary source of power.

Any type of windmill can be used in the present invention. The old and well known Dutch-style mills are preferred.

A novel windmill designed specifically for use in the present invention is shown in FIGS. 4 and 5. The mill 10 has a rotor 12 mounted in a housing 14 for rotation about a vertical axis 16. A plurality of vertically extending curved blades 18 form the peripheral surface of the rotor 12. The side walls of the housing 14 are provided with a plurality of vertically extending vanes 20 which guide wind to the rotor 12. The blades 18 and vanes 20 can be movable or fixed, as desired.

The housing 14 has a generally rectangular shape so that it will blend with the architecture of the home or building being powered. As shown in FIG. 5, the vertically extending vanes 20 provide the appearance of the outward contour of a building.

In operation, wind guided through the vanes 20 impinges on the blades 18 and imparts rotation to the rotor 12. The rotor 12 rotates about the vertical axis 16. The rotor hub can be connected to a drive shaft operatively connected to a device to be driven.

The windmill 10 is preferably mounted on a roof or other elevated and exposed portion of the house 22, as shown in FIG. 6. Such an arrangement maximizes the windmill's exposure to the wind. It is understood, however, that the windmill can be located elsewhere. For example, the windmill could be mounted atop a tower separate from the house 22 or it could be mounted atop a hill or rise in the vicinity of the house 22.

Referring to FIG. 1, it can be seen that the windmill 10 drives a compressor 24. The compressor 24 takes in atmospheric air on inlet line 26 and expels highly compressed air on outlet line 28. It is preferred that the compressed air have a pressure of about 200 atmospheres.

The compressed air is directed to a cryogenic insulated storage tank 30 where it is liquified and stored. Such tanks are well known and any person of ordinary skill in the art could readily design and construct a tank for liquifying and storing the compressed air. Because liquid air is about 794 times as dense as gaseous air, a great amount can be stored in a relatively small cryogenic tank. The needs of a home for 10 days can be stored in a tank having a diameter and a height of about 8'.

Referring again to FIG. 6, the cryogenic tank 30 is shown buried beneath the ground floor 32 of the house 22. That location is preferred for safety reasons. In the unlikely event that the pressurized tank 30 exploded, the ground would absorb a substantial portion of the tank fragments. The remaining fragments would be directed upwardly by the ground and would be absorbed by the ground floor 32 of the house 22 and the compressor 24 and water tanks 34 and 36 located on the ground floor 32 directly above the cryogenic tank 30. The possibility of tank fragments injuring persons or other property in the house 22 is thus made extremely remote.

It is understood, however, that the cryogenic tank 30 can be located anywhere, including locations above ground, partially above ground, partially or wholly inside the house 22, or wholly outside the house 22.

Stored air is released from the cryogenic tank 30 as needed to power an air motor 38. The air is released at medium pressure, preferably about 20–30 atmospheres, from an outlet orifice 40 connected to an outlet line 42.

Preferably, the released air is vaporized in part by the heat generated along the high pressure outlet line 28 of the compressor 24. FIGS. 2 and 3 show two alternative embodiments for carrying out that vaporization procedure.

As shown in FIG. 2, the outlet line 42 extends parallel to and closely adjacent to the outlet line 28. Heat from the outlet line 28 is conducted through the atmosphere to the outlet line 42.

As shown in FIG. 3, the outlet line 28' is concentrically disposed within the outlet line 42'. This arrangement is more effective that the arrangement shown in FIG. 2 because the outlet line 42' receives that radiated in any direction from the outlet line 28'.

Referring again to FIG. 1, it can be seen that the partially vaporized air is directed into a heat exchanger 4 and expelled therefrom on outlet line 46 as fully vaporized air.

The heat exchanger 44 is part of a refrigeration circuit. A coolant, preferably water, is driven through the heat exchanger 44 by a pump 48. The air passing through the heat exchanger 44 on lines 42 and 46 absorbs heat from the water during vaporization. Cold water is thus expelled from the heat exchanger 44 on outlet line 50.

The cold water is in part directed to a cold water storage tank 36, the tank is provided with a valved outlet line 52 which permits domestic use of the cold water as needed.

Remaining portions of the cold water are directed to refrigerator units 54 and air conditioner units 56 in the house 22. The warmed water expelled by the refrigerators 54 and air conditioners 56 is returned to the pump 48 along return line 58. Condensate is withdrawn from the air conditioner units 56 and directed along line 60 to a water storage tank 62. The tank 62 has a valved outlet 64 which supplies water for domestic use as needed.

The vaporized air is pre-heated before entering the air motor 38.

Line 46 feeds the vaporized air through a heat exchanger 66 in circuit with a fossil fuel heater 68. Fossil fuels burned in the heater 68 warm a fluid which circulates through the heat exchanger to communicate heat to the vaporized air passing therethrough.

The air is also directed through a heat exchanger 70 in circuit with a solar heater 72. The heater 72 preferably consists of one or more solar collectors mounted atop the windmill 10. The heat collected by the collectors warms a fluid which circulates through the heat exchanger 70 to communicate heat to the air passing therethrough.

Heating is also accomplished by passing the air through a heat exchanger 74 in a circuit which extracts the heat generated by the initial compression of the atmospheric air. A liquid coolant is pumped through the compressor by pump 76. The heat of compression generated in the compressor is communicated to the coolant. The hot coolant is passed through a heat exchanger 78. Water circulating through the heat exchanger 78 is heated by the hot coolant. The heated water is withdrawn from the heat exchanger and stored in a hot water storage tank 34. Hot water is withdrawn from the tank 34 on outlet line 80 and pumped through the heat exchanger 74 by pump 82. Heat from the hot water is communicated to air passing through the heat exchanger 74. Cooled water is withdrawn from the heat exchanger 74 and returned to the heat exchanger 78 along return line 84.

It is understood that the pre-heating circuit employing the heat of compression can be varied from the specific structure shown in FIG. 1. For example, the heat exchanger 78 can be eliminated when the compressor coolant is water. The return line 84 would be connected directly to the inlet for compressor coolant and the outlet of the pump 76 would be connected directly to the inlet of the storage tank 34. On the other hand, both the heat exchanger 78 and the storage tank 34 can be eliminated where there is no desire to provide a store of hot water. Return line 84 would be connected directly to the inlet for compressor coolant and the outlet pump 76 would be connected directly to the inlet of the heat exchanger 74. Heated compressor coolant would be circulated directly to the heat exchanger 74 for heating of the air passing therethrough.

The hot water storage tank 34 is provided with a valved outlet line 86 to provide hot water for domestic use as needed.

It is understood that one or more or all of the air pre-heating circuits can be eliminated, if desired. It is similarly understood that the refrigeration circuit including heat exchanger 44 and the heat recovering arrangement of lines 28 and 42 and 28' and 42' shown in FIGS. 2 and 3 can be eliminated, if desired.

The pre-heated vaporized air drives an air motor 38. Such air motors are well known in the art and can be readily designed and constructed by any person of ordinary skill.

Pressurized air entering the motor 38 on inlet line 88 is expanded in the motor 38 and is expelled therefrom as cold exhaust on outlet line 90. The cold exhaust is fed to refrigeration units 92 and air conditioner units 94 in the house 22. The heated exhaust expelled by the refrigerator units 92 and air conditioner units 94 is recycled to the inlet of compressor 24 by return line 96.

It is understood that the circuit comprising refrigerator units 92, air conditioner units 94, and return line 96 can be eliminated, if desired, and the exhaust from air motor 38 can be released to the atmosphere.

The air motor 38 is operatively connected to an electric generator 98. The generator 98 preferably produces conventional 60 cycle AC current for domestic use.

It is apparent that the air motor 38 can drive other machinery as well. For example, it could be used to operate power tools and appliances.

Condensed water vapor formed in the cryogenic tank 30 can be withdrawn by pump 100 and fed to the water storage tank 62.

Nitrogen and oxygen can be extracted from the cryogenic tank 30 at valved outlets 102 and 104 respectively.

An auxiliary compressor 106 is provided to power the system during extended periods of wind drought. The compressor 106 receives atmospheric air and recirculated air from return line 96. The air compressed by compressor 106 is fed into the cryogenic tank 30. The compressor is driven by the air motor 38.

Under extreme circumstances, it may be necessary to provide either the fossil fuel heating circuit or the solar heating circuit or both to effectively operate the auxiliary compressor 106.

An overview of the operation of the present invention and its accompanying advantages and efficiencies can now be readily understood.

Windmill power is used to compress atmospheric air to a high pressure. A large quantity of compressed air is liquified and stored in a relatively small cryogenic storage tank. The stored air is withdrawn from the tank as needed and vaporized and heated to drive an air motor. The air motor in turn drives a generator which produces a substantial portion of the electricity required in a home.

The heat generated by compression of the atmospheric air is extracted and used to produce a store of hot water and to pre-heat the air entering the air motor.

The liquified air stored in the cryogenic tank serves as a heat sink in the sense that it can be vaporized and expanded to chill refrigerant in refrigerant circuits.

The compressed air produced by the system is available to operate standard tools, appliances and other air-driven devices in the home.

Water condensed in the cryogenic tank and the refrigeration circuits is collected and stored in a water storage tank. The stored water proves valuable in dry climates lacking subterranean water.

While the invention has been described with reference to specific embodiments, the exact nature and scope of the invention is defined in the following claims.

I claim:

1. Windmill power apparatus comprising
   windmill means for converting wind into compressor-operating energy,
   compressor means operatively driven by the windmill means for compressing a gaseous fluid to a relatively high pressure,
   storage means for accumulating compressed fluid in a liquid state, said storage means having outlet means for releasing accumulated fluid under pressure, and
   fluid motor means for receiving fluid released by the outlet means and being operatively driven thereby,
   heat extracting means connected to the compressor means for retracting heat of compression generated in compressing the gaseous fluid, wherein the heat extracting means comprises cooling circuit means for circulating coolant through the compressor means, fluid circuit means for circulating heat storage fluid and heat exchange means for communicating heat from the coolant to the heat storage fluid, and further comprising second heat exchange means for communicating heat from the heat storage fluid to the fluid released from the outlet means before said released fluid enters the fluid motor means.

2. The apparatus of claim 1 wherein the fluid circuit means comprises fluid storage means for accumulating heated heat storage fluid.

3. The apparatus of claim 1 wherein the coolant comprises water.

4. The apparatus of claim 1 wherein the heat storage fluid comprises water.

5. The apparatus of claim 2 wherein the storage means is located underground and the fluid storage means is located on the ground directly above the storage means.

6. Windmill power apparatus comprising
   windmill means for converting wind into compressor-operating energy,
   compressor means operatively driven by the windmill means for compressing a gaseous fluid to a relatively high pressure,
   storage means for accumulating compressed fluid in a liquid state, said storage means having outlet means for releasing accumulated fluid under pressure, and
   fluid motor means for receiving fluid released by the outlet means and being operatively driven thereby,
   heat extracting means connected to the compressor means for extracting heat of compression generated in compressing the gaseous fluid, wherein the heat extracting means comprises cooling circuit means for circulating coolant through the compressor means, fluid circuit means for circulating heat storage fluid and heat exchange means for communicating heat from the coolant to the heat storage fluid, and further comprising heat exchange means for communicating said heat of compression to the fluid released from the outlet means before said released fluid enters the fluid motor means.

7. The apparatus of claim 6 further comprising vaporization means for vaporizing liquid released from the outlet means.

8. The apparatus of claim 7 wherein the vaporization means comprises fluid circuit means for circulating refrigerant fluid and heat exchange means for communicating heat from the refrigerant to the liquid released from the outlet means, thereby cooling the refrigerant and vaporizing the liquid.

9. The apparatus of claim 8 wherein the fluid circuit means comprises refrigeration means for communicating heat from air passing therethrough to said refrigerant, thereby cooling said air.

10. The apparatus of claim 6 further comprising means connected to said storage means for extracting condensed fluid vapor from the storage means.

11. The apparatus of claim 6 further comprising auxiliary compressor means operatively driven by the fluid motor means for compressing gaseous fluid for accumulation in the storage means.

12. The apparatus of claim 6 further comprising fluid recycling means for receiving fluid exhausted by the fluid motor means for recycling said exhausted fluid to the compressor means.

13. The apparatus of claim 12 wherein the fluid recycling means comprises refrigeration means for communicating heat from air passing therethrough to said fluid.

14. The apparatus of claim 6 further comprising
solar heating means for converting sunlight to heat,
fluid heating means for heating heat storage fluid with heat from said solar means, and
heat exchange means for communicating heat from said heat storage fluid to the fluid released from the outlet means before said released fluid enters the fluid motor means.

15. The apparatus of claim 6 further comprising
heater means for burning fossil fuel to produce heat,
fluid heating means for heating heat storage fluid with heat from said heater means, and
heat exchange means for communicating heat from said heat storage fluid to the fluid released from the outlet means before said released fluid enters the fluid motor means.

16. The apparatus of claim 6 wherein the windmill means comprises
a wind guide housing having side walls provided with a plurality of vertically extending vanes for directing wind into the housing, and
a rotor mounted in the housing for rotational movement about a vertical axis, said rotor having a plurality of vertically extending blades positioned about the periphery of the rotor.

17. The apparatus of claim 6 wherein the gaseous fluid comprises air.

18. The apparatus of claim 6 wherein the gaseous fluid is compressed to a pressure of about 200 atmospheres.

19. The apparatus of claim 6 wherein the outlet means releases accumulated liquid at a pressure of about 20 atmospheres.

20. The apparatus of claim 17 wherein the fluid motor means comprises an air motor.

21. The apparatus of claim 10 wherein the refrigerant fluid comprises water.

22. The apparatus of claim 6 wherein the storage means comprises a storage tank having an inlet conduit and an outlet conduit, said inlet and outlet conduits being positioned in sufficient proximity to each other to effect heat exchange therebetween.

23. The apparatus of claim 6 wherein the storage means comprises a storage tank having an inlet conduit and an outlet conduit, said inlet conduit being positioned within the outlet conduit.

24. The apparatus of claim 6 wherein the storage means is underground.

25. The apparatus of claim 14 wherein the solar means comprises a solar collector.

26. Windmill power apparatus comprising
windmill means for converting wind to compressor-operating energy,
compressor means operatively driven by the windmill means for compressing a gaseous fluid,
storage means for accumulating compressed fluid, said storage means having outlet means for releasing accumulated fluid under pressure,
heat extracting means for extracting the heat of compression generated in compressing the gaseous fluid,
heat exchange means for communicating said heat of compression to the fluid released from the outlet means, and
fluid motor means for receiving heated fluid from the heat exchange means and being operatively driven thereby.

27. The apparatus of claim 26 wherein the heat extracting means comprises cooling circuit means for circulating coolant through the compressor means.

28. The apparatus of claim 27 wherein the heat exchange means comprises
fluid circuit means for circulating heat storage fluid,
first heat exchange means for communicating heat from the coolant to the heat storage fluid, and
second heat exchange means for communicating heat from the heat storage fluid to the fluid released from the outlet means before said released fluid enters the fluid motor means.

29. Windmill power method comprising
converting wind into compressor-operating energy,
driving a compressor by the energy,
compressing gaseous fluid to a relatively high pressure,
accumulating compressed fluid in a liquid state,
releasing accumulated fluid under pressure,
driving a fluid motor by said released fluid,
extracting the heat of compression generated in compressing the gaseous fluid, and
communicating said heat of compression to the released fluid before said released fluid enter the fluid motor.

30. The method of claim 29 further comprising vaporizing released fluid.

31. The method of claim 29 further comprising recycling fluid exhausted by the fluid motor to the compressor.

32. Windmill power method comprising
converting wind into compressor-operating energy,
driving a compressor by the energy,
compressing a gaseous fluid,
accumulating compressed fluid,
releasing accumulated fluid under pressure,
extracting heat of compression generated in compressing gaseous fluid,
communicating said heat of compression to the released fluid, and
driving a fluid motor by the heated fluid.

* * * * *